(12) United States Patent
Wieland

(10) Patent No.: US 8,214,614 B2
(45) Date of Patent: Jul. 3, 2012

(54) AVOIDING INFORMATION DISCLOSURE WHEN DIRECT MAPPING NON-PAGE ALIGNED BUFFERS

(75) Inventor: Peter William Wieland, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 694 days.

(21) Appl. No.: 12/359,070

(22) Filed: Jan. 23, 2009

(65) Prior Publication Data

US 2010/0106931 A1    Apr. 29, 2010

Related U.S. Application Data

(60) Provisional application No. 61/108,374, filed on Oct. 24, 2008.

(51) Int. Cl.
*G06F 12/02* (2006.01)

(52) U.S. Cl. ............... 711/165; 711/202; 711/E12.002; 711/E12.016

(58) Field of Classification Search ............... 711/165, 711/201–202, E12.002, E12.016
See application file for complete search history.

(56) References Cited

U.S. PATENT DOCUMENTS

| 5,754,821 | A | 5/1998 | Cripe et al. |
| 5,991,856 | A | 11/1999 | Spilo et al. |
| 6,854,039 | B1 | 2/2005 | Strongin et al. |
| 6,901,474 | B2 | 5/2005 | Lym et al. |
| 7,320,041 | B2 | 1/2008 | Biran et al. |
| 2006/0168212 | A1 | 7/2006 | Parsons et al. |
| 2008/0229044 | A1 | 9/2008 | Krig |
| 2009/0100213 | A1* | 4/2009 | Dyke et al. ............... 711/100 |
| 2009/0282198 | A1* | 11/2009 | Hamoudi et al. ........... 711/147 |

OTHER PUBLICATIONS

Bruijn, et al."Using Beltway Buffers for Efficient and Structured I/O", Retrieved at<<http://www.cs.vu.nl/~herbertb/papers/beltwaybuffers_IR-CS-028.pdf>>, Technical Report IR-CS-028, Sep. 2006, pp. 15.
Leslie, et al."Encapsulated User-Level Device Drivers in the Mungi Operating System", Proceedings of the Workshop on Object Systems and Software Architectures 2004, Victor Harbor, South Australia, Australia, Jan. 2004, Retrieved at<<http://ertos.nicta.com.au/publications/papers/Leslie_FH_04.ps.gz.>>, pp. 6.
Andersen, et al."Part 3: Memory Protection Technologies", Retrieved at<<http://technet.microsoft.com/en-us/library/bb457155.aspx>>, Aug. 9, 2004, pp. 7.
"Memory Management: What Every Driver Writer Needs to Know", Retrieved at<<http://download.microsoft.com/ download/e/b/a/eba1050f-a31d-436b-9281-92cdfeae4b45/mem-mgmt.doc>>, Feb. 28, 2005, pp. 35.

* cited by examiner

*Primary Examiner* — Jamine Song
(74) *Attorney, Agent, or Firm* — Capitol City TechLaw; Richard C. Irving

(57) ABSTRACT

A method and a processing device are provided for mapping a non-page aligned memory buffer to an address space of a process. A beginning portion of a non-page aligned memory buffer and an ending portion of the non-page aligned memory buffer may be copied from respective original memory pages to new memory pages. Unused portions of the new memory pages may be initialized to zeros, ones, or other values. A safe buffer may be created, which resides in the new memory pages and all original memory pages of the non-page aligned memory buffer, except for the original memory pages including either the beginning portion or the ending portion of the non-page aligned buffer. The safe buffer may then be mapped to an address space of a process while avoiding unintended information disclosure.

20 Claims, 6 Drawing Sheets

AVOIDING INFORMATION DISCLOSURE WHEN DIRECT MAPPING NON-PAGE ALIGNED BUFFERS

This application claims the benefit of U.S. Provisional Patent Application No. 61/108,374, entitled, "Avoiding Information Disclosure When Direct Mapping Non-Page Aligned Buffers", filed in the U.S. Patent and Trademark Office on Oct. 24, 2008.

BACKGROUND

A system may use a device driver to communicate with a mouse, a printer, or other device. A common way of transferring data between two processes or between a process and a device driver includes copying data from a one memory buffer to another memory buffer. When an amount of data is large such as, for example, larger than 24 kilobytes (KB), or another suitable value, copying of data is too time-consuming. When the amount of data is large, a memory buffer may be directly mapped to an address space of another process or a device driver. Memory mapping has a granularity that is generally a size of a memory page, which may be 4 KB, 8 KB, or another size.

When a memory buffer does not start or end on a memory page boundary, the memory buffer is non-page aligned. When a memory page buffer is non-page aligned, data that is outside of the memory buffer, but within the memory page, may be exposed to a process or device driver having an address space to which the memory buffer is mapped. If a first one of a process or device driver does not trust a second one of the process or the device driver, having an address space to which the memory buffer is mapped, there is concern regarding whether the second one of the process or the device driver is able to access secret information of the first one of the process or the device driver, or is able to tamper with information of the first one of the process of the device driver. For example, if the first one of the process or the device driver is a kernel-mode driver and the second one of the process or the device driver is a process, then when the mapped memory buffer is non-page aligned, the process may access or modify passwords, other secret data, or control data within the kernel-mode driver address space, and/or the kernel-mode driver may access or modify data within the process address space. If a driver was, instead, a user-mode driver, a non-page aligned memory mapped buffer would allow a process, receiving a request and a buffer, to access an address space of a process which owns the buffer, but not vice versa.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

A machine-implemented method and a processing device may be provided for mapping a non-page aligned memory buffer to an address space of a process. In various embodiments, at most, a beginning portion of a non-page aligned memory buffer may be copied to a first new memory page and an ending portion of the non-page aligned memory buffer may be copied to a second new memory page. Unused portions of the first new memory page and/or the second new memory page may be initialized to zeros, ones, or other values. A safe buffer may be created, which resides in the first new memory page and/or the second new memory page and all original memory pages of the non-page aligned memory buffer, except for a first original memory page, including a beginning of the non-page aligned buffer, and/or a second original memory page including an ending of the non-page aligned memory buffer. The safe buffer may then be mapped to an address space of a process.

In some embodiments consistent with the subject matter of this disclosure, when only one of a beginning portion of a non-page aligned memory buffer or an ending portion of the non-page aligned memory buffer is non-page aligned, the one of the beginning portion of the non-page aligned memory buffer or the ending portion of the non-page aligned memory buffer may be copied to a first new memory page. An unused portion of the first new memory page may be initialized to zeros, ones, or other values. A safe buffer may be created, which resides in the first new memory page and all original memory pages of the non-page aligned memory buffer, except for an original memory page which includes the one of the beginning portion of the non-page aligned buffer or the ending portion of the non-page aligned memory buffer. The safe buffer may then be mapped to an address space of a process.

In some embodiments consistent with the subject matter of this disclosure, when data included in a beginning portion of a non-page aligned memory buffer and data included in an ending portion of the non-page aligned memory buffer can fit into a single memory page, the beginning portion of the non-page aligned memory buffer and the ending of the non-page aligned memory buffer may be copied to a first new memory page. An unused portion of the first new memory page may be initialized to zeros, ones, or other values. A safe buffer may be created, which resides in the first new memory page and all original memory pages of the non-page aligned memory buffer, except for original memory pages which include the beginning portion of the non-page aligned buffer and the ending portion of the non-page aligned memory buffer. The safe buffer may then be mapped to an address space of a process.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

Figure 1:
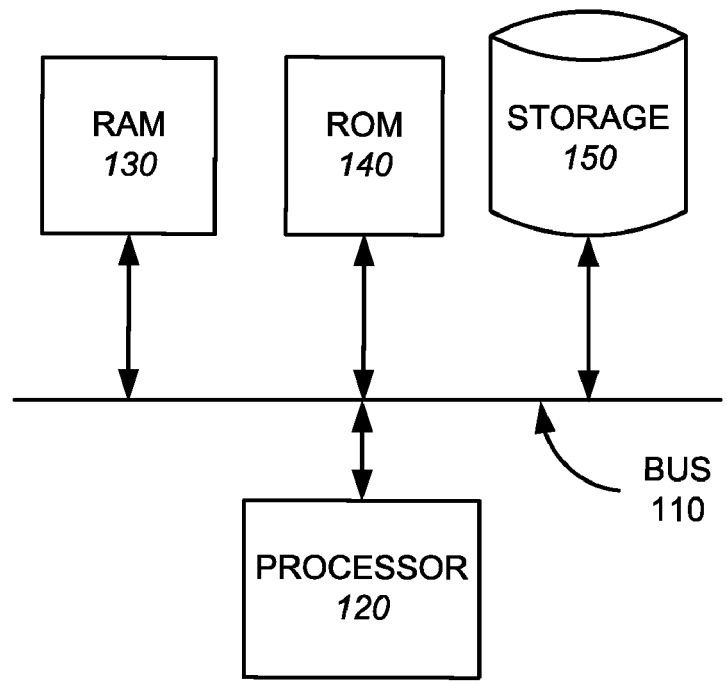
FIG. 1 is a functional block diagram of an exemplary processing device, which may be used to implement embodiments consistent with subject matter of this disclosure.
Figure 4:
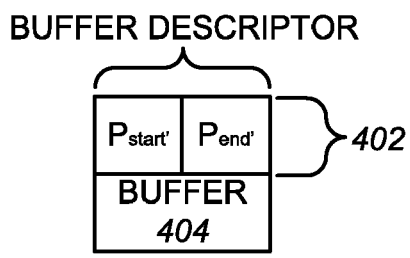
FIG. 4 illustrates an exemplary buffer descriptor and a two-page memory buffer, which may be allocated in embodiments consistent with the subject matter of this disclosure.
Figure 5:
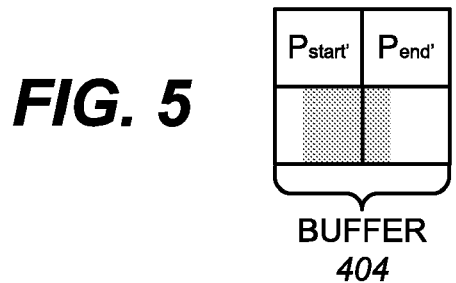

FIG. 5 corresponds to FIG. 4 having a shaded portion illustrating data copied from a portion of a memory buffer of FIG. 1 residing in memory page $P_{start}$ and memory page $P_{end}$.

Figure 3:
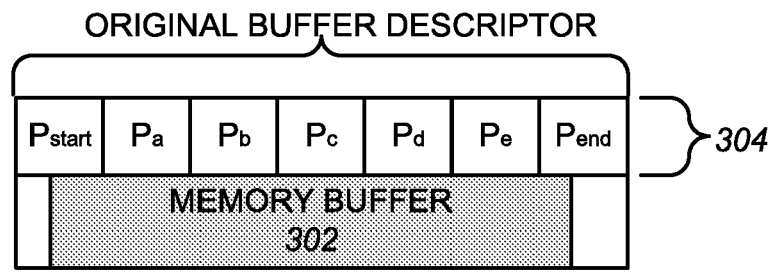
FIG. 3 illustrates an exemplary memory buffer, and corresponding buffer descriptor, which may be provided by a process requesting memory mapping in embodiments consistent with the subject matter of this disclosure.
Figure 6:
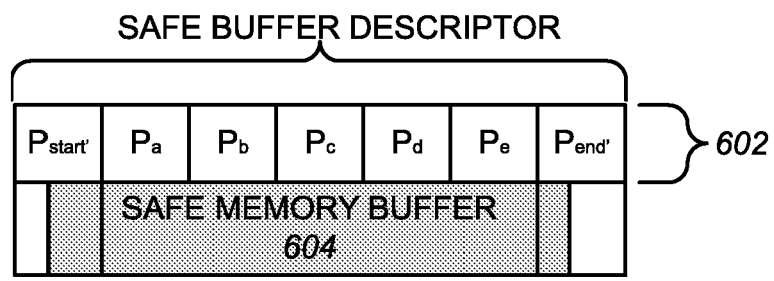

FIG. 6 illustrates an exemplary safe buffer descriptor and an exemplary safe memory buffer corresponding to an original buffer descriptor and a memory buffer shown in FIG. 3.

Figure 7:
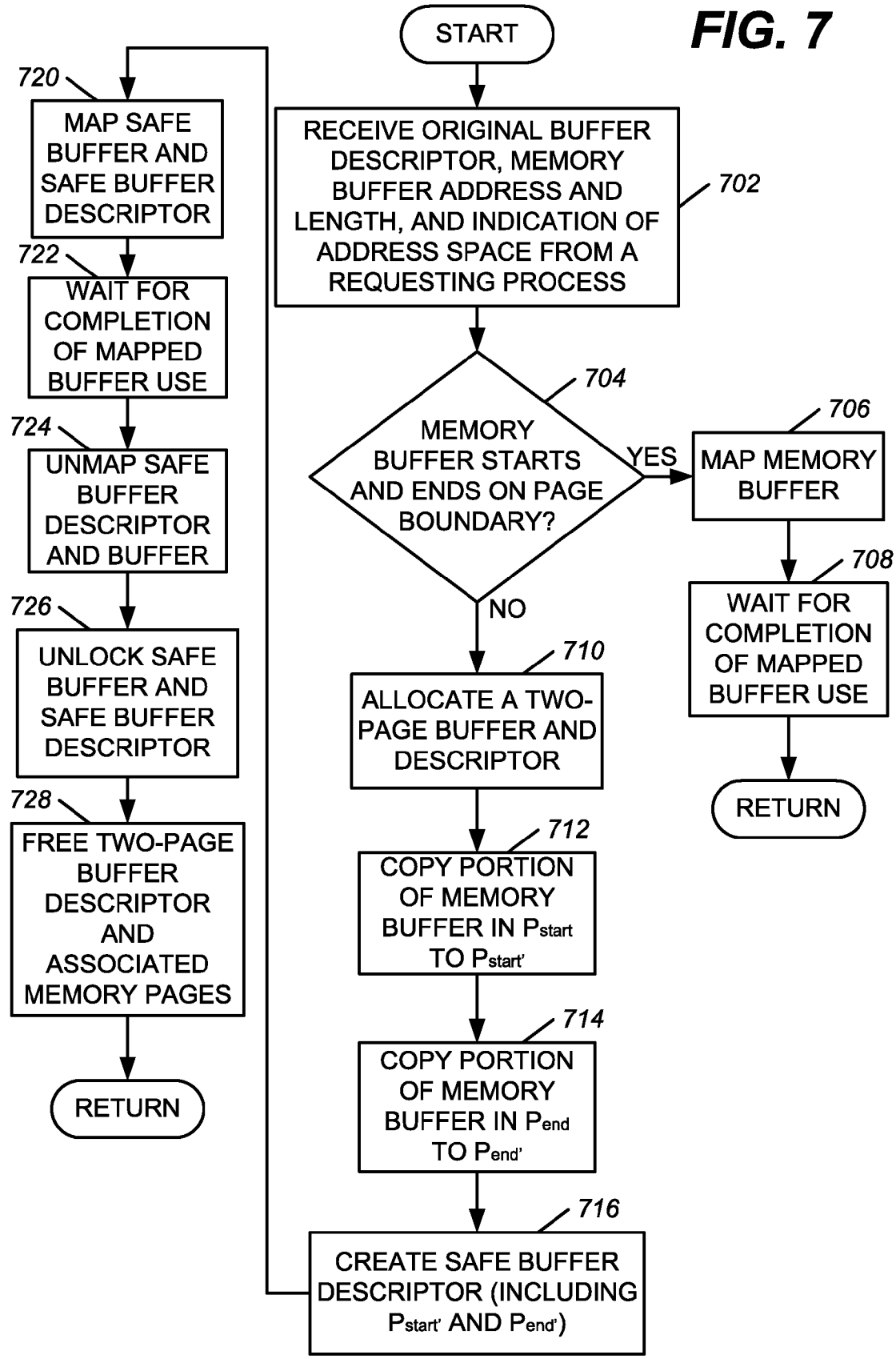

FIG. 7 is a flowchart illustrating an exemplary process which may be performed in embodiments consistent with the subject matter of this disclosure.

Figure 8:
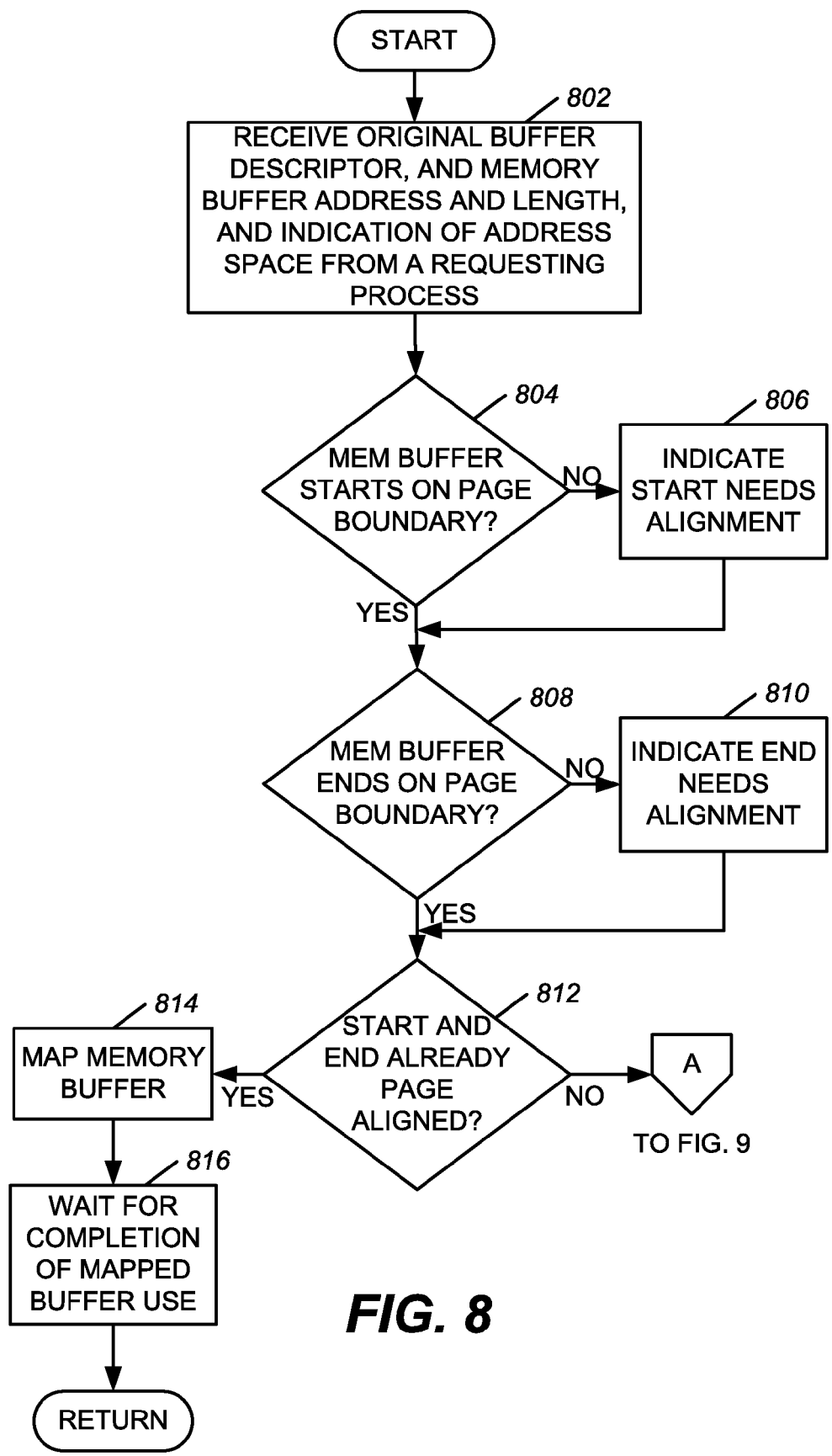
Figure 9:
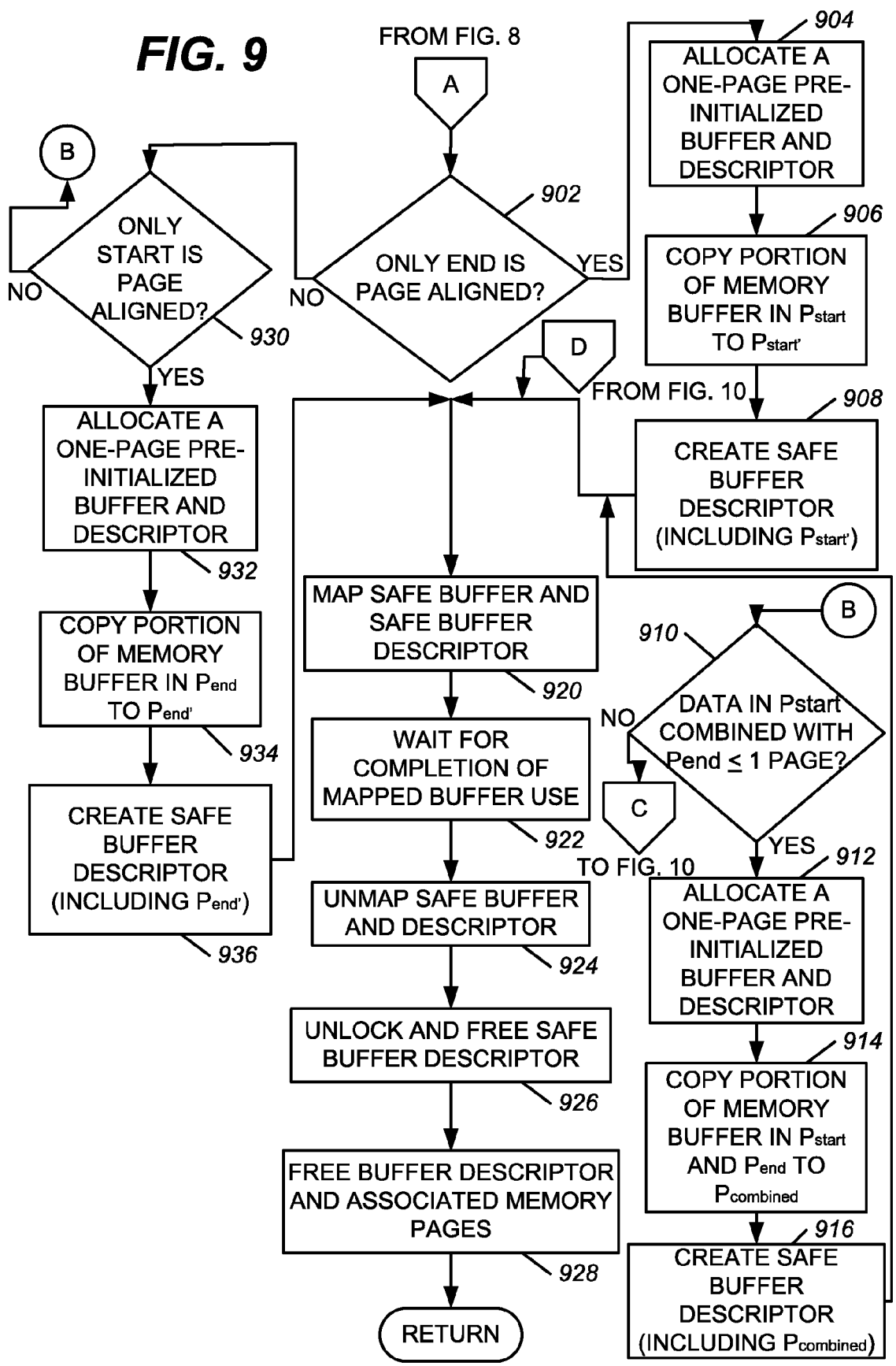
Figure 10:
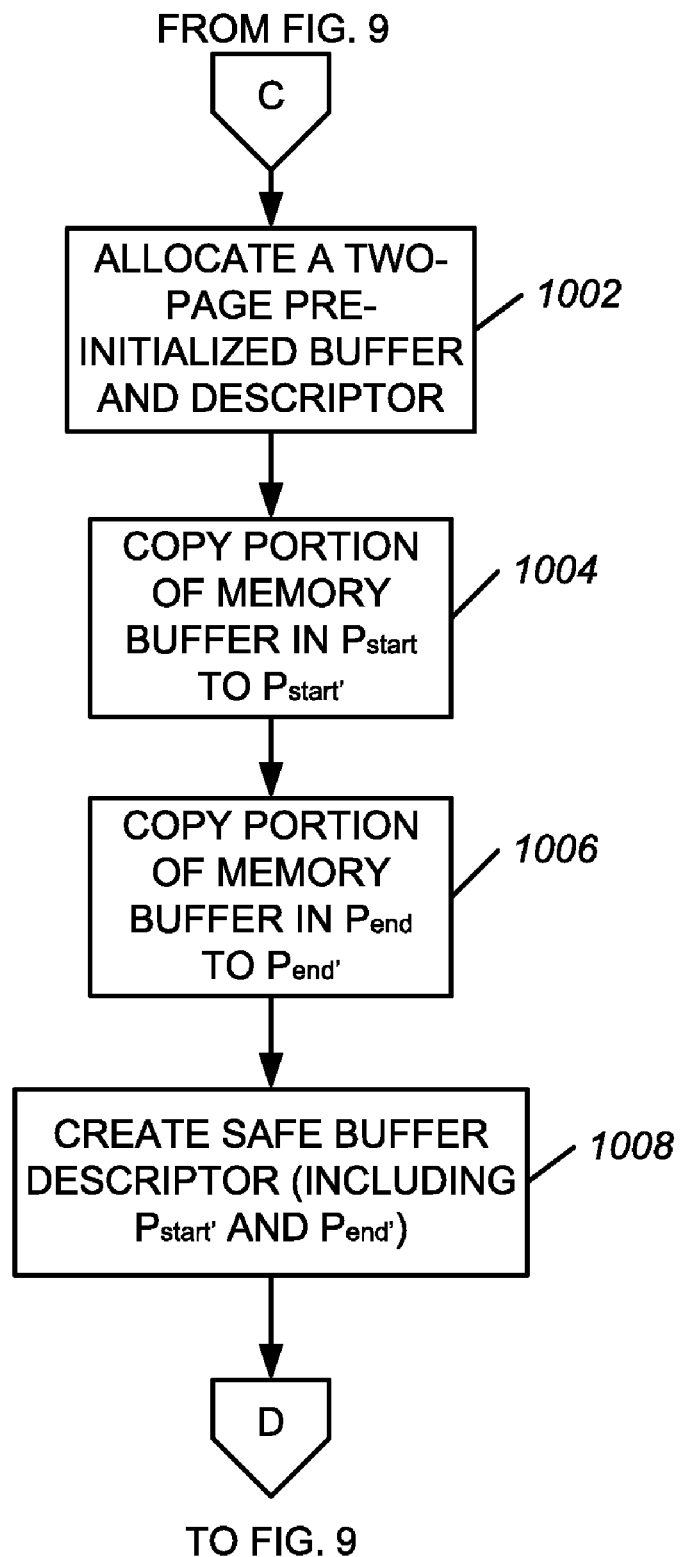

FIGS. 8-10 are flowcharts illustrating a second exemplary process which may be performed in embodiments consistent with the subject matter of this disclosure.

DETAILED DESCRIPTION

Embodiments are discussed in detail below. While specific implementations are discussed, it is to be understood that this is done for illustration purposes only. A person skilled in the relevant art will recognize that other components and configurations may be used without parting from the spirit and scope of the subject matter of this disclosure.

Overview

Embodiments consistent with the subject matter of this disclosure may permit a first process to make a large non-page aligned buffer available to a second process (for reading or writing) with the efficiency of memory mapping, but without exposing data outside of the non-page aligned memory buffer to unauthorized access or tampering by the second process. The first process or the second process may include a driver, such as a device driver or a kernel-mode driver.

In various embodiments, one or more portions of a non-page aligned memory buffer may be copied to one or more respective memory buffers in respective memory pages. At most, a beginning portion of a memory buffer may be copied to a first new memory page and an ending portion of the memory buffer may be copied to a second new memory page. Remaining portions of the first new memory page and/or the second new memory page may be initialized to zeros, ones, or other values. A safe buffer, resides in all original memory pages in which a non-page aligned buffer resides, except for a first memory page including a beginning of the non-page aligned buffer, and/or a second memory page including an ending of the non-page aligned memory buffer. Thus, any data residing outside of a non-page aligned memory buffer within a memory page may not be subject to unauthorized access or modification.

Exemplary Processing Device

FIG. 1 is a functional block diagram of an exemplary processing device 100, which may be used to implement embodiments consistent with the subject matter of this disclosure. Processing device 100 may be a desktop personal computer (PC), a notebook or laptop PC, a server, or other processing device. Processing device 100 may include a bus 110, a random access memory (RAM) 130, a read only memory (ROM) 140, a processor 120, and a storage device 150. Bus 110 may permit communication among components of processing device 100.

Processor 120 may include at least one conventional processor or microprocessor that interprets and executes instructions. RAM 130 may be a random access memory (RAM) or another type of dynamic storage device that stores information and instructions for execution by processor 120. RAM 130 may store temporary variables or other intermediate information used during execution of instructions by processor 120. ROM 140 may include a conventional ROM device or another type of static storage device that stores static information and instructions for processor 120. Storage device 150 may include a hard disk and corresponding drive, a flash-based storage device, or other type of data storage device or medium for storing data and/or instructions for processor 120.

Processing device 100 may perform functions in response to processor 120 executing sequences of instructions contained in a tangible machine-readable medium, such as, for example, memory, which may include, but not be limited to, RAM 130 and/or ROM 140, storage device 150 or other media. Such instructions may be read into RAM 130 from another machine-readable medium or from a separate device via a communication interface (not shown).

Exemplary Embodiments

Figure 2:
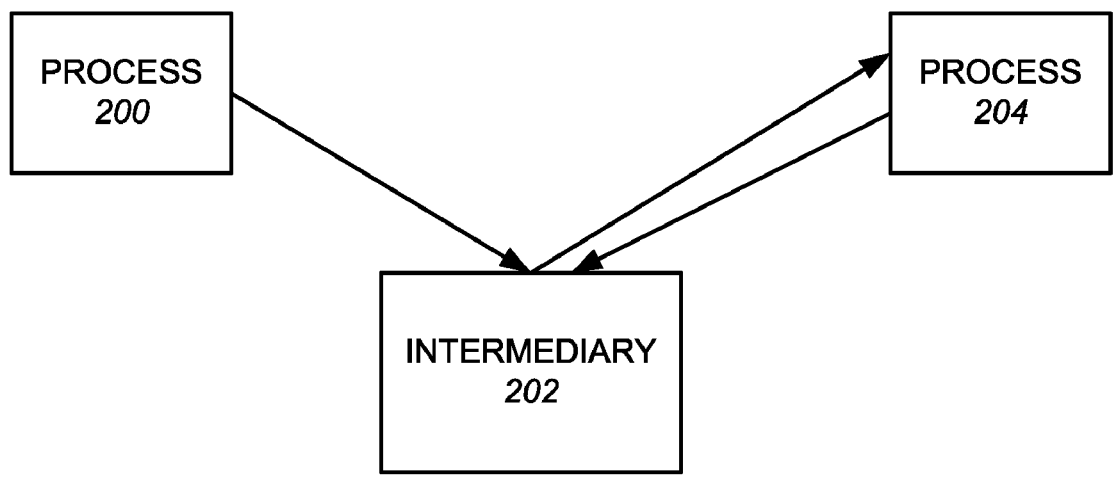
FIG. 2 is a functional block diagram illustrating a first process, an intermediary, and a second process in an exemplary embodiment consistent with the subject matter of this disclosure.

FIG. 2 is a functional block diagram illustrating an exemplary embodiment consistent with the subject matter of this disclosure. FIG. 2 shows a process 200, an intermediary 202, and a process 204. Either of process 200 or process 204 may include a driver, including, but not limited to, a device driver or a kernel-mode driver. In some embodiments, intermediary 202 may be included in an operating system, such that intermediary 202 may be called via a system call or other mechanism.

Process 200 may take an action, which may cause intermediary 202 to be called to request mapping of a memory buffer to an address space of process 204. Process 200 may not directly map its own address space into the address space of process 204. Instead, process 200 may provide permission for intermediary 202 or process 204 to map the address space of process 200 into the address space of process 204. The mapping may be under control of either intermediary 202 or process 204 (possibly by invoking intermediary 202). For example, process 200 may provide intermediary 202 with a memory buffer address, a length of the memory buffer, and an indication of an address space to which the memory buffer is to be mapped. Intermediary 202 may then map the memory buffer to the address space, such as the address space of process 204. In embodiments consistent with the subject matter of this disclosure, any information, which resides in a memory page that includes a portion of the memory buffer to be mapped and which is outside of the memory buffer to be mapped, is not mapped and is not subject to unauthorized access or modification as a result of mapping the memory buffer.

When process 204 has completed using the mapped memory buffer, process 204 may provide an indication to that effect, either directly or indirectly, to intermediary 202. For example, process 204 may send a message to intermediary 202 indicating that process 204 has completed using the memory mapped buffer, or process 204 may imply that process 204 has completed use of the memory mapped buffer by calling intermediary 202 to indicate that process 204 desires to respond to a message which references the memory mapped buffer.

When intermediary 202 determines that use of the memory buffer by process 204 is completed, intermediary 202 may unmap the memory buffer. In some embodiments, intermediary 202 may unmap the memory buffer and may provide an indication to a memory mapping requesting process, such as process 200 in this example. Process 200 may then reuse the memory buffer.

FIG. 3 shows an exemplary memory buffer 302 and an original buffer descriptor 304, which may be provided by a process requesting memory mapping of memory buffer 302. Buffer descriptor 304 may include a number of page identifiers, or page frame numbers (PFNs), each of which refers to a respective physical memory page. According to FIG. 3, memory buffer 302 spans several physical memory pages, including physical memory pages corresponding to pages $P_{start}$, $P_a$, $P_b$, $P_c$, $P_d$, $P_e$, $P_{end}$. As can be seen in FIG. 3, memory buffer 302 is non-page aligned.

FIG. 4 illustrates an exemplary buffer descriptor 402 and a two-page length buffer 404, which intermediary 202 may allocate upon detecting that memory buffer 302 is non-page aligned. In this example, buffer descriptor 402 may include PFNs corresponding to new physical memory pages $P_{start'}$ and $P_{end'}$. Intermediary 202 may copy a first portion of memory buffer 302 residing in physical memory page $P_{start}$ to physical memory page $P_{start'}$ and a last portion of memory buffer 302 residing in physical memory page $P_{end}$ to physical memory page $P_{end'}$, as shown by a shaded area in FIG. 5. The first portion of the memory buffer residing in memory page $P_{start}$ may be copied from an end of physical memory page $P_{start}$ to physical memory page $P_{start'}$. The last portion of the memory buffer residing in physical memory page $P_{end}$ may be copied beginning from a beginning of physical memory page $P_{end}$ to physical memory page $P_{end'}$. Remaining, or unused, portions of memory pages $P_{start'}$ and $P_{end'}$ may be initialized to zeros, ones, or any other value.

FIG. 6 illustrates a safe buffer descriptor 602, which intermediary 202 may create, and safe memory buffer 604, which corresponds to memory buffer 302. Safe buffer descriptor 602 may include PFNs corresponding to $P_{start'}$ and $P_{end'}$, as well as middle PFNs $P_a$, $P_b$, $P_c$, $P_d$, $P_e$ from original buffer descriptor 304. Thus, a middle portion of memory buffer 604 may include a middle portion of memory buffer 302. Intermediary 202 may then map memory buffer 604 to the address space of a process.

In this example, only a beginning and an end of memory buffer 302 may be copied in order to protect information disclosure, or tampering, of data of a physical memory page, which is outside of a non-page-aligned memory buffer.

FIG. 7 is a flowchart illustrating exemplary processing in an intermediary consistent with the subject matter of this disclosure. The process may begin with the intermediary receiving a request from a requesting process. The request may include information with respect to an original buffer descriptor, a memory buffer address and length, and an indication of an address space of a second process to which a memory buffer is to be mapped (act 702). In some embodiments, the intermediary, or another component, may create the original buffer descriptor based on the memory buffer address and the length of the memory buffer. Next, the intermediary may determine whether the memory buffer is page aligned (starts and ends on a page boundary) (act 704).

If the memory buffer is determined to be page aligned, then the intermediary may map the memory buffer to the address space of the second process (act 706). The intermediary may then wait for a direct, or implied indication regarding completion of use of the mapped memory buffer (act 708). Upon receiving the indication, the process may be completed.

If, during act 704, the intermediary determines that the memory buffer does not start on a page boundary or does not end on a page boundary, then the intermediary may allocate a two-page buffer and a corresponding two-page buffer descriptor (act 710). The intermediary may then copy a portion of a beginning of the memory buffer residing in a physical memory page (referred to as $P_{start}$) to a second physical memory page (referred to as $P_{start'}$) (act 712). Copying may begin from an end of physical memory page $P_{start}$ to physical memory page $P_{start'}$. A remaining, or unused, portion of memory residing within the second physical memory page ($P_{start'}$) but being outside of the memory buffer, may be initialized to zeros, ones, or another value, as part of act 712.

A last portion of the memory buffer residing in a third physical memory page (referred to as $P_{end}$) may be copied beginning from a beginning of physical memory page $P_{end}$ to a fourth physical memory page (referred to as $P_{end'}$). Copying may proceed until copying an end of memory buffer 302 from physical memory $P_{end}$ to physical memory page $P_{end'}$ (act 714). A remaining, or unused, portion of memory residing within the fourth memory page ($P_{end'}$), but being outside of the memory buffer, may be initialized to zeros, ones, or another value, as part of act 714.

Next, the intermediary may create a safe buffer descriptor, which may include all PFNs from the original buffer descriptor, except for $P_{start}$ and $P_{end}$, which are replaced by $P_{start'}$ and $P_{end'}$ (act 716). The intermediary may then map a safe buffer and the safe buffer descriptor to the address space of the second process (act 720). The safe buffer may be included within the physical memory pages $P_{start'}$ and $P_{end'}$, as well as all original memory pages of the memory buffer, except for the physical memory pages $P_{start}$ and $P_{end}$.

The intermediary may then wait for a direct or implied indication of completion of use of the mapped buffer (act 722). After completion of the use of the mapped buffer, the intermediary may unmap the safe buffer and the safe buffer descriptor (act 724). In some embodiments, contents of the safe buffer, included in physical memory pages $P_{start'}$ and $P_{end'}$, may be copied back to physical memory pages $P_{start}$ and $P_{end}$ before the safe buffer is unmapped.

After the safe buffer and the safe buffer descriptor are unmapped, the two-page buffer descriptor and the corresponding buffer may then be unlocked (act 726). The intermediary may then free the two-page buffer descriptor and the associated buffer (memory pages) (act 728). The process may then be completed.

FIGS. 8-10 are flowcharts illustrating a variation of the process of FIG. 7 in another embodiment consistent with the subject matter of this disclosure. The process may begin with an intermediary receiving a request from a requesting process. The request may include information with respect to an original buffer descriptor, a memory buffer address and length, and an indication of an address space of a second process to which a memory buffer is to be mapped (act 802). In some embodiments, the intermediary, or another component, may create the original buffer descriptor based on the memory buffer address and the length of the memory buffer. Next, the intermediary may then determine whether the memory buffer starts on a memory page boundary (act 804).

If the memory buffer is determined to not start on a memory page boundary, then the intermediary may set a first indication to indicate that the memory buffer does not start on a memory page boundary (act 806).

Next, the intermediary may determine whether the memory buffer ends on a memory page boundary (act 808). If the memory buffer is determined to not end on a memory page boundary, then the intermediary may set a second indication to indicate that the memory buffer does not end on a memory page boundary (act 810).

The intermediary may then determine, based on the first indication and the second indication, whether a start and an end of the memory buffer are already page aligned (act 812). If the memory buffer is already page aligned, then the intermediary may map the memory buffer to the address space of the second process (act 814). The intermediary may then wait for a direct or implied indication regarding completion of use of the mapped memory buffer (act 816). After receiving the indication, the process may be completed.

If, during act 812, the intermediary determines that the start and the end of the memory buffer are not both page aligned, then the intermediary may determine whether only the end of the memory buffer is page aligned (i.e., the start of the memory buffer is non-page aligned) (act 902). If the intermediary determines that only the end of the memory buffer is page aligned, then the intermediary may allocate a one-page pre-initialized buffer and a corresponding one-page buffer descriptor (act 904). The one-page buffer may be pre-initialized with zeros, ones, or another value and the one-page buffer descriptor may be pre-initialized to a value corresponding to a physical memory page, such as, for example, $P_{start'}$. The intermediary may then copy a portion of a beginning of the memory buffer residing in an original physical memory page (for example, $P_{start}$) to the physical memory page (referred to as $P_{start'}$) (act 906). Copying may begin from an end of physical memory page $P_{start}$ to physical memory page $P_{start'}$.

The intermediary may then create a safe buffer descriptor, which may include PFN $P_{start'}$, and all of the PFNs of the original buffer descriptor, except for $P_{start}$ (act 908). A safe buffer may include all original memory pages of the memory buffer except for memory page $P_{start}$, which may be replaced by memory page $P_{start'}$. The intermediary may then map the safe buffer and the safe buffer descriptor to the address space of the second process (act 920).

The intermediary may then wait for a direct or implied indication of completion of use of the mapped buffer (act 922). After completion of the use of the mapped buffer, the intermediary may unmap the safe buffer and the corresponding buffer descriptor (act 924). In some embodiments, contents of the safe buffer, included in the physical memory page $P_{start'}$ (or $P_{end'}$) may be copied back to physical memory page $P_{start}$ (or $P_{start'}$) before the safe buffer is unmapped. Similarly, when a beginning and an end of the memory buffer have been combined into one physical memory page ($P_{combined}$), then a portion of the memory buffer in the physical memory page $P_{combined}$ may be copied to the memory page $P_{start}$, and a second portion of the memory buffer in the physical memory page $P_{combined}$ may be copied to the physical memory page $P_{end}$.

After the safe buffer and the safe buffer descriptor are unmapped, the one-page (or two-page) buffer descriptor and corresponding buffer may then be unlocked (act 926). The intermediary may then free the one-page (or two-page) buffer descriptor and the corresponding buffer (act 928). The process may then be completed.

If, during act 902, the intermediary determines that not only the ending portion of the memory buffer is page aligned (i.e., only a beginning portion of the memory buffer is page aligned, or neither the beginning portion nor the ending portion of the memory buffer are page aligned), then the intermediary may determine whether only the beginning portion of the memory buffer is page aligned (act 930). If only the beginning portion of the memory buffer is memory page aligned, then the intermediary may allocate a one-page pre-initialized buffer and a corresponding buffer descriptor (act 932). The one-page buffer may be pre-initialized with zeros, ones, or another value and the corresponding buffer descriptor may be pre-initialized to a value corresponding to a memory page, such as, for example, $P_{end'}$. The intermediary may then copy a portion of an ending of the memory buffer residing in an original physical memory page (for example, $P_{end}$) to a new physical memory page (referred to as $P_{end'}$) (act 934). Copying may begin from a beginning of physical memory page $P_{end}$ to physical memory page $P_{end'}$.

The intermediary may then create a safe buffer descriptor, which may include PFN $P_{end'}$, and all of the PFNs of the original buffer descriptor, except for $P_{end}$ (act 936). A safe buffer may include all original physical memory pages of the memory buffer except for physical memory page $P_{end}$, which may be replaced by physical memory page $P_{end'}$. The intermediary may then perform acts 920-928, as described previously.

If, during act 930, the intermediary determines that neither the beginning portion nor the ending portion of the memory buffer are page aligned, then the intermediary may determine whether contents of the first portion of the memory buffer in physical memory page $P_{start}$ and contents of the second portion of the memory buffer in physical memory page $P_{end}$ can fit into one physical memory page (act 910). If the contents of the memory buffer in the physical memory page $P_{start}$ and the contents of the memory buffer in the physical memory page $P_{end}$ cannot fit into one memory page, then the intermediary may allocate a pre-initialized two-page buffer and a corresponding pre-initialized buffer descriptor (act 1002; FIG. 10). The two-page buffer may be pre-initialized to zeros, ones, or another value and the two-page buffer descriptor may be pre-initialized to a value corresponding to physical memory pages, such as, for example, $P_{start'}$ and $P_{end'}$. The intermediary may then copy a portion of a beginning of the memory buffer residing in a physical memory page (referred to as $P_{start}$) to a second physical memory page (referred to as $P_{start'}$) (act 1004). Copying may begin from an end of physical memory page $P_{start}$ to physical memory page $P_{start'}$.

The intermediary may then copy a portion of an end of the memory buffer residing in an original memory page (referred to as $P_{end}$) to a third memory page (referred to as $P_{end'}$) (act 1006). Copying may begin from a beginning of physical memory page $P_{end}$ to physical memory page $P_{end'}$.

Next, the intermediary may create a safe buffer descriptor, which may include all PFNs from the original buffer descriptor, except for $P_{start}$ and $P_{end}$, which may be replaced by $P_{start'}$ and $P_{end'}$ (act 1008). A safe buffer may include all original memory pages of the memory buffer except for memory pages $P_{start}$ and $P_{end}$, which may be replaced by memory page $P_{start'}$ and $P_{end'}$, respectively. Acts 920-928 (FIG. 9) may then be performed as previously described.

If, during act 910, the intermediary determines that the contents of the first portion of the memory buffer in memory page $P_{start}$ and the contents of the second portion of the memory buffer in memory page $P_{end}$ can fit into one memory page, then the intermediary may allocate a one-page pre-initialized buffer and a corresponding buffer descriptor (act 912). Referring to the one-page pre-initialized buffer as $P_{combined}$, the first portion of the memory buffer in the memory page $P_{start}$ may be copied to the memory page $P_{combined}$, and the second portion of the memory buffer in memory page $P_{end}$ may be copied to the memory page $P_{combined}$ (act 914). Copying of the first portion of the memory buffer may begin from an end of physical memory page $P_{start}$ to physical memory page $P_{combined}$. Copying of the second portion of the memory buffer may begin with a beginning of the physical memory page $P_{end}$ copied to the physical memory page $P_{combined}$. The intermediary may then create a safe buffer descriptor, which may start and end with PFN $P_{combined}$, and may include all of the PFNs of the original buffer descriptor, except for $P_{start}$ and $P_{end}$, between $P_{combined}$ at the start of the safe buffer descriptor and $P_{combined}$ at the end of the safe buffer descriptor (act 916). The intermediary may then perform acts 920-928, as described previously.

When unmapping a mapped memory buffer, which originally was not page aligned, a starting portion of the mapped memory buffer and/or an ending portion of the mapped memory buffer may be copied to the original memory page(s) of the memory buffer, such as, for example, the memory page $P_{start}$ and/or the memory page $P_{end}$.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they are not be construed as limiting the claims in any way. Other configurations of the described embodiments are part of the scope of this disclosure. Accordingly, the appended claims and their legal equivalents define the invention, rather than any specific examples given.

I claim as my invention:

1. A machine-implemented method for mapping a non-page aligned memory buffer to an address space of a process:
    determining whether the memory buffer starts on a first page boundary;
    determining whether the memory buffer ends on a second page boundary;
    when the memory buffer is determined not to start on the first page boundary and the memory buffer is determined to end on the second page boundary, performing:
        copying data from a beginning portion of the memory buffer within a first original memory page to a first memory page, and
        mapping a safe buffer to the address space of the process, the safe buffer residing in the first memory page and all original memory pages of the memory buffer except for the first original memory page; and
    when the memory buffer is determined to start on the first page boundary and the memory buffer is determined not to end on the second page boundary, performing:
        copying data from an ending portion of the memory buffer within a second original memory page to a second memory page, and
        mapping the safe buffer to the address space of the process, the safe buffer residing in the second memory page and all original memory pages of the memory buffer except for the second original memory page.

2. The machine-implemented method of claim 1, wherein:
    the first memory page is initialized before the copying data from the beginning portion of the memory buffer to the first memory page; and
    the second memory page is initialized before the copying data from the ending portion of the memory buffer within the second original memory page to the second memory page.

3. The machine-implemented method of claim 2, wherein the first memory page and the second memory page are initialized to a predetermined value.

4. The machine-implemented method of claim 1, further comprising initializing an unused portion of the first memory page or the second memory page.

5. The machine-implemented method of claim 1, wherein the process includes a driver.

6. The machine-implemented method of claim 5, wherein the driver is a kernel-mode driver.

7. The machine-implemented method of claim 1, wherein:
    when the memory buffer is determined not to start on the first page boundary and the memory buffer is determined not to end on the second page boundary, performing:
        determining whether the beginning portion of the memory buffer and the ending portion of the memory buffer can fit into a single memory page,
        when the beginning portion of the memory buffer and the ending portion of the memory buffer are determined to fit into a single memory page, performing:
            copying the data from the beginning portion of the memory buffer within the first original memory page to an other memory page,
            copying the data from the ending portion of the memory buffer within the second original memory page to the other memory page, and
            mapping the safe buffer to the address space of the process, the safe buffer residing in the other memory page, and all original memory pages of the memory buffer except for the first original memory page and the second original memory page.

8. The machine-implemented method of claim 1, further comprising initializing an unused portion of the first memory page or the second memory page to a predetermined value.

9. A machine-readable data storage device having instructions recorded therein for at least one processor, when the at least one processor executes the instructions a method is performed to map a non-page aligned memory buffer to an address space of a process, the method comprising:
    determining whether the memory buffer starts on a first page boundary;
    determining whether the memory buffer ends on a second page boundary;
    when the memory buffer is determined not to start on the first page boundary and the memory buffer is determined to end on the second page boundary, performing:
        copying data from a beginning portion of the memory buffer within a first original memory page to a first memory page or, and
        mapping a safe buffer to the address space of the process, the safe buffer residing in the first memory page and all original memory pages of the memory buffer except for the first original memory page; and
    when the memory buffer is determined to start on the first page boundary and the memory buffer is determined not to end on the second page boundary, performing:
        copying data from an ending portion of the memory buffer within a second original memory page to a second memory page, and
        mapping the safe buffer to the address space of the process, the safe buffer residing in the second memory page and all original memory pages of the memory buffer except for the second original memory page.

10. The machine-readable data storage device of claim 9, wherein the method further comprises:
    when the memory buffer is determined to not start on the first page boundary and the memory buffer is determined not to end on the second page boundary, performing
        determining whether the data in the beginning portion of the memory buffer and the data in the ending portion of the memory buffer can be combined to fit into a single memory page;

when the data in the beginning portion of the memory buffer and the data in the ending portion of the memory buffer are determined to be capable of being combined into the single memory page, performing:
copying the data from the beginning portion of the memory buffer within the first original memory page and the data from the ending portion of the memory buffer within the second original memory page into the single memory page, and
mapping a safe buffer to the address space of the process, the safe buffer residing in the single memory page and all original memory pages of the memory buffer except for the first original memory page and the second original memory page.

11. The machine-readable data storage device of claim 9, wherein the process includes a driver.

12. The machine-readable data storage device of claim 9, wherein the instructions further comprise:
waiting for an indication that the process has completed using the mapped safe buffer; and
performing, after the waiting, one of:
copying data from a portion of the safe buffer residing in the first memory page to the first original memory page, or
copying the data from a portion of the safe buffer residing in the second memory page to the second original page.

13. A processing device comprising:
at least one processor; and
a memory connected to the at least one processor, the memory comprising a plurality of instructions for the at least one processor, when the at least one processor executes the plurality of instructions, a method is performed comprising:
receiving, by an intermediary, a request from a requesting process to map a memory buffer to an address space of a second process,
determining, by the intermediary, whether the memory buffer starts on a first page boundary,
determining, by the intermediary, whether the memory buffer ends on a second page boundary,
when the memory buffer is determined not to start on the first page boundary and the memory buffer is determined to end on the second page boundary, performing:
copying, by the intermediary, data included in a beginning portion of the memory buffer in a first original memory page to a first memory page, and
mapping, by the intermediary, a safe buffer to the address space of the second process, the safe buffer including the first memory page and all original memory pages that include at least a portion of the memory buffer excluding the first original memory page, and
when the memory buffer is determined to start on the first page boundary and the memory buffer is determined not to end on the second page boundary, performing:
copying, by the intermediary, data included in an ending portion of the memory buffer in a second original memory page to a second memory page, and
mapping, by the intermediary, the safe buffer to the address space of the second process, the safe buffer including the second memory page and all original memory pages that include at least a portion of the memory buffer excluding the second original memory page.

14. The processing device of claim 13, wherein the method further comprises:
waiting, by the intermediary, for an indication that the second process has completed using the safe buffer, and
freeing the first memory page or the second memory page after the intermediary receives the indication.

15. The processing device of claim 13, wherein the intermediary is included in an operating system.

16. The processing device of claim 13, wherein the method further comprises:
waiting, by the intermediary, for an indication that the second process has completed using the safe buffer, and
copying, by the intermediary after the waiting, data from a portion of the safe buffer residing in the first memory page or the second memory page to the first original memory page or the second original memory page from which the portion of the safe buffer was originally copied.

17. The processing device of claim 13, wherein one of the requesting process or the second process includes a driver.

18. The processing device of claim 17, wherein the driver is a kernel-mode driver.

19. The processing device of claim 13, wherein the method further comprises:
creating, by the intermediary, a safe buffer descriptor including one or more page frame numbers corresponding to one of the first memory page or the second memory page and all original memory pages that include at least a portion of the memory buffer excluding ones of the original memory pages having a respective portion of the memory buffer copied to the one of the first memory page or the second memory page.

20. The machine-readable data storage device of claim 13, wherein the method further comprises:
when the memory buffer is determined not to start on the first page boundary and the memory buffer is determined not to end on the second page boundary, performing:
determining whether the beginning portion of the memory buffer and the ending portion of the memory buffer can fit into a single memory page,
when the beginning portion of the memory buffer and the ending portion of the memory buffer are determined to fit into a single memory page, performing:
copying the data from the beginning portion of the memory buffer within the first original memory page to an other memory page,
copying the data from the ending portion of the memory buffer within the second original memory page to the other memory page, and
mapping the safe buffer to the address space of the second process, the safe buffer residing in the other memory page, and all original memory pages of the memory buffer except for the first original memory page and the second original memory page.

* * * * *